W. B. CRAIG.
ROTARY POWER MECHANISM.
APPLICATION FILED MAY 9, 1913.
1,102,247.
Patented July 7, 1914.
2 SHEETS—SHEET 1.
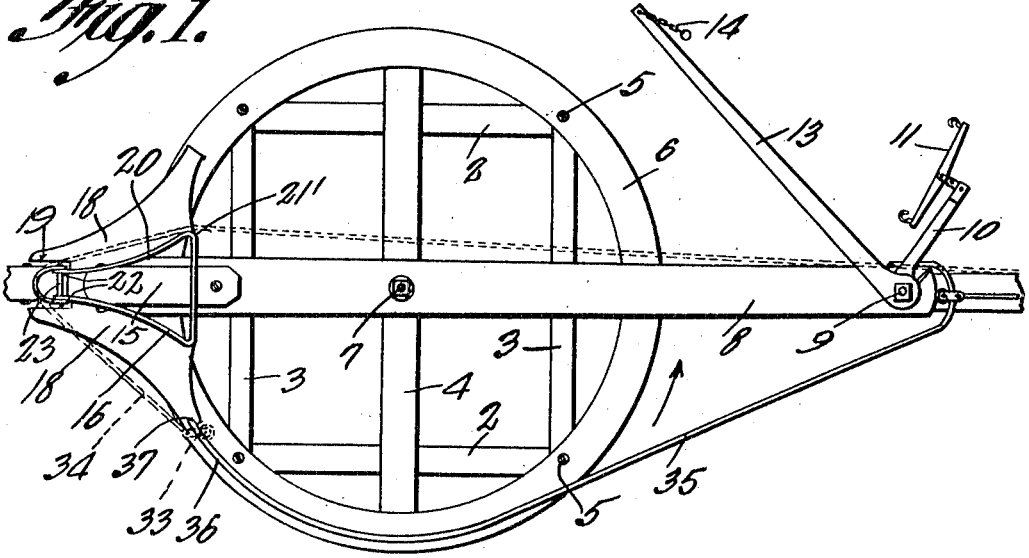
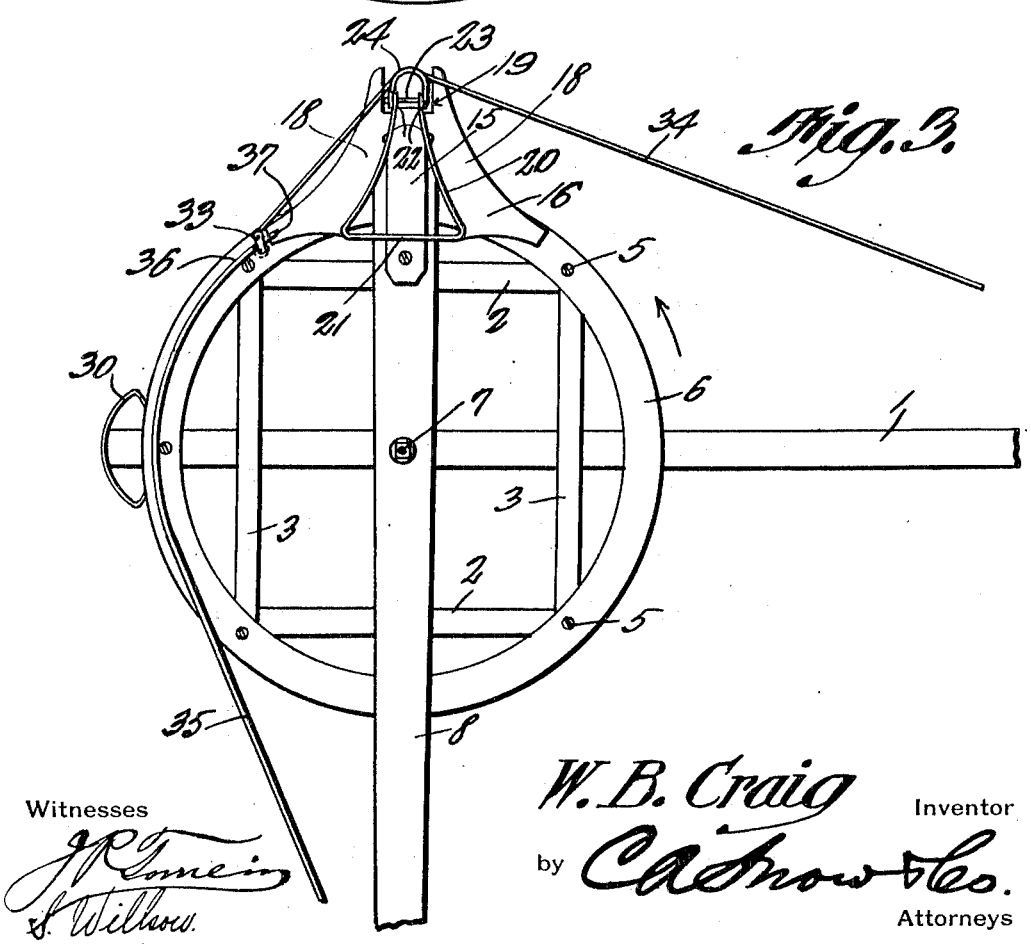
Witnesses
Inventor
W. B. Craig
by C. A. Snow & Co.
Attorneys

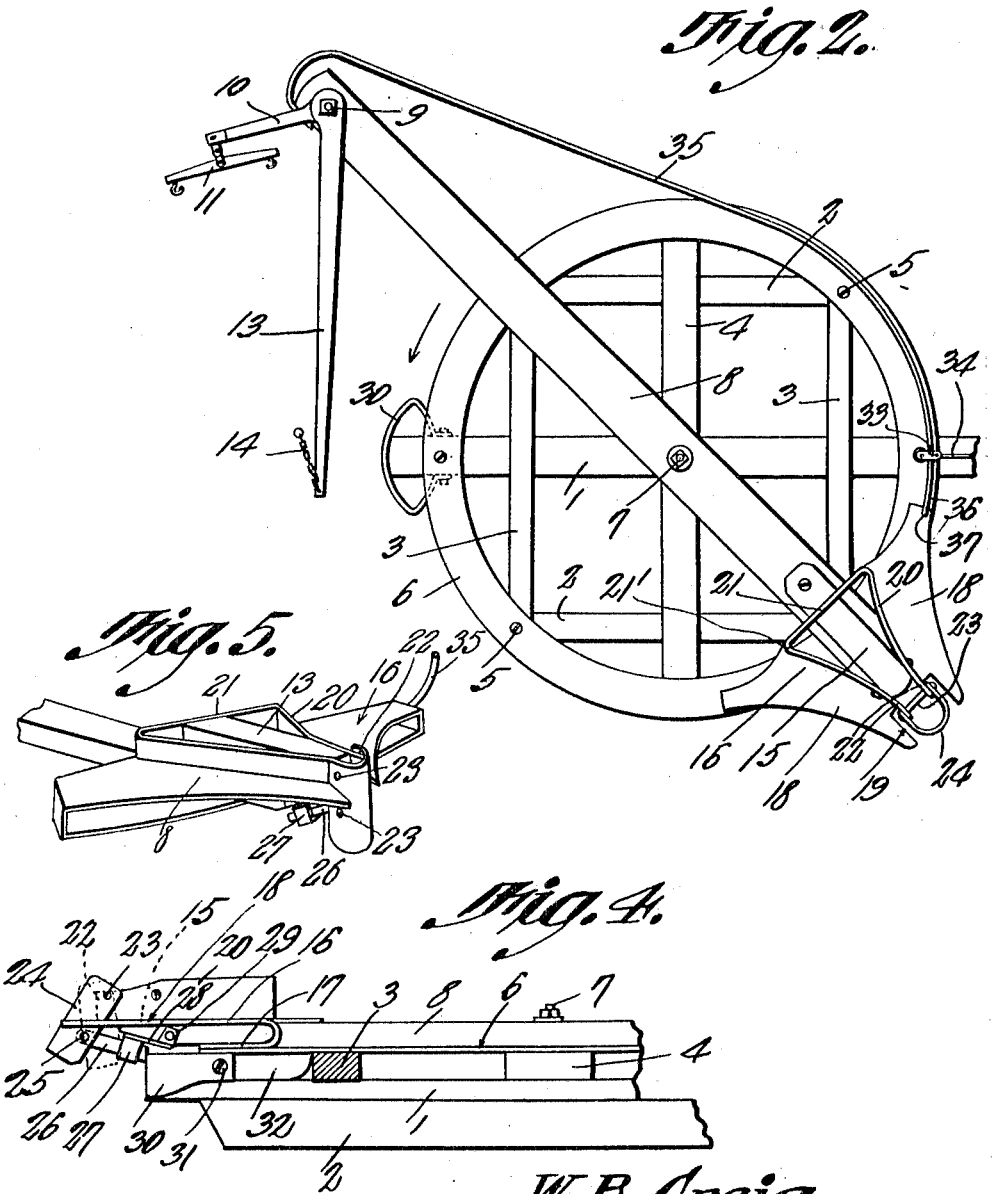

UNITED STATES PATENT OFFICE.

WILLIAM B. CRAIG, OF MARTINSVILLE, ILLINOIS.

ROTARY POWER MECHANISM.

1,102,247.   Specification of Letters Patent.   Patented July 7, 1914.

Application filed May 9, 1913. Serial No. 766,653.

*To all whom it may concern:*

Be it known that I, WILLIAM B. CRAIG, a citizen of the United States, residing at Martinsville, in the county of Clark and State of Illinois, have invented a new and useful Rotary Power Mechanism, of which the following is a specification.

The present invention relates to improvements in rotary power mechanisms, one object of the present invention being the provision of a power mechanism, in which the main operating lever is permitted a rotary movement, said rotary movement being preferably imparted by a draft animal, there being means provided for connecting thereto a hoisting cable, whereby the hoisting cable is permitted the necessary pull and releasing action, without the necessity of alternately driving the draft animal forward and backing the same.

A further object of the present invention is the provision of a novel means, whereby the terminal of the hoisting cable is connected to the power lever and properly guided, during the rotation thereof so that the necessary take-up will be imparted to the cable during a greater portion of the stroke of the lever, the same being automatically released to permit the return movement of the cable, the cable being alternately pulled and released without the necessary moving forward and backing of the draft animal, thereby permitting a continued pull by the draft animal during the drawing and releasing of the cable.

A still further object of the present invention is the provision of a simple and inexpensive structure of this character, and one which may be readily applied to any derrick mechanism, as for instance a hay stacker or the like, the same dispensing with the usual pulling and backing action of the draft animal, and thus dispensing with the necessity of using two persons, one to handle the horse, and another to handle the hoisting cable upon the ground, as the continued movement of the horse in one direction, as will presently appear, automatically pulls and releases the cable.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a top plan view of the power mechanism with the parts in the position when the cable is fully released. Fig. 2 is a top plan view of the power mechanism with the parts in the position they assume at the initial exertion of the power stroke to pull upon the cable. Fig. 3 is a similar view with the power mechanism in intermediate pulling stroke position. Fig. 4 is an enlarged detail view showing the cable releasing means in released position, dotted lines illustrating the same previous to such release position. Fig. 5 is an enlarged detail end view of the trigger carrying mechanism.

Referring to the drawings, the numeral 1 designates a longitudinal beam, which when the device is used with a hay stacker is fastened rigidly to the stacker and which provides a means whereby the sled members 2 may be dragged from place to place. The sled members 2 have attached thereto upon the upper face and transversely thereof, the two narrow beams 3 and the central wider beam 4, the beams 3 and 4 having attached at 5 the circular guide rail 6 for the power lever 8, as will presently appear.

A king or pivoting pin 7 is connected to the beams 1 and 4 at their point of intersection and carries the power beam or lever 8, which at the long free end thereof is provided with the pivoting pin 9 to which is connected the swingletree carrying arm 10 carrying the swingletree 11, and with the lead arm 13 provided with the lead chain 14. By this means, the draft animal may be properly connected so that the necessary rotary movement is imparted to the power lever 8, with the pin 7 its center.

The projecting portions 15 and 32 are carried by the short end of the power lever 8, the same normally projecting beyond the guide rail 6, and forming a means whereby the runner 16 is properly attached. This runner is preferably made of metal and is provided with the runner metal plate or shoe 17 which rests upon the track 6 and thus properly supports the lever 8 during the rotation thereof about the pin 7.

This runner 16 is provided with the wings 18, which at their point of convergence are provided with the slot 19 while the rope guiding rim 20 is preferably made rectangular in top plan, as clearly illustrated in Figs. 1, 2 and 3, and is provided with the straight rim portion 21 so that the junction 21' between the rim 20 and the rim 21 will provide a proper cable engaging portion, as clearly illustrated in dotted lines in Fig. 1.

In the terminals 22 is mounted a pin 23, which forms a pivoting and supporting member for the rope engaging locking and releasing member 24, the lower free end of which is provided with a pin 25 which carries the operating rod or stud 26. This rod or stud 26 is guided through the eye 27 carried by the plate 28, said plate 28 being provided with the apertured lugs 29 which are connected to the extreme under side of the end of the power lever 8, as clearly illustrated in Fig. 4. The free end of this stud 26 is disposed when the parts are in the position, as shown in Figs. 1 and 4, to engage the operating cam plate 30 which is secured to the extreme end of the projection 32 carried by the beam 1 and thus eccentrically of the pin 7 and guide rail 6.

In order to provide a means for properly guiding the terminal connection 33 of the hoisting cable 34 during the pulling thereupon and the release thereof, a rod 35 has its forward end connected to the free end of the lever 8 adjacent the pin 9 thereof, while the opposite end 36 is connected at 37 to the locking and releasing member carrying runner 16. A portion of the rod 35 is bent concentric to the pin 7, as clearly shown in Figs. 1, 2 and 3, while the other portion converges at a tangent toward the extreme long end of the lever 8 or at a tangent to the circular guide rail 6, the purpose which will presently appear.

The rod 35, although shown curved, may be a straight rod, while the runner 16, may be shaped differently, so that the pull upon the cable may be regulated as desired and still be within the scope of the invention.

From the foregoing description, taken in connection with the drawings, the operation of the present power mechanism will be readily understood, but briefly stated it is as follows: Assuming that the parts are in the position as shown in full lines in Fig. 1, with the cable 34 released and thus with the mechanism to be hoisted at its lowermost position, and with the beam 8 being moved in the direction of the arrow, it is evident that the rod 35 will permit the terminal 33 of the cable 34 to ride thereupon to successively assume the position as shown in Fig. 2, such terminal 33 engaging the flexing end 36 of the rod 35 and due to the continued rotation of the lever 8, as clearly illustrated in Fig. 3, being held fast to such point so that a portion of the cable will pass around the upper end of the pivoted member 24 which acts as an abutting means to thus take up the slack in the cable and permit of the cable being drawn to its full pulling movement, as shown in dotted lines in Fig. 1. At this point, the cam 30 is engaged by the rod 26, so that the member 24 is tilted to the position as shown in Fig. 4, at which time the cable will be released from the member 24 and consequently from the rim 20 of the runner 16 to, by gravity, be pulled so that its terminal 33 will assume the full release position, as shown in Fig. 1. Thus it will be seen that the draft animal is permitted to continually pull the lever 8, imparting a rotation thereto so that the cable 34 is pulled upon and released without the necessity of backing the draft animal, as is the usual practice with cable hoists.

What is claimed is:

1. A rotary power mechanism, including a support, a rotatable power lever carried thereby, a hoisting cable, means carried by the lever for slidably connecting one terminal of the cable to the lever, and coöperating means carried by the lever and support for automatically engaging and releasing the cable during the rotation of the lever.

2. A rotary power mechanism, including a support, a rotatable power lever carried thereby, a hoisting cable, means carried by the lever for slidably connecting one terminal of the cable to the lever, a pivoted member mounted in one end of the lever and projecting thereabove to engage the cable intermediate of its ends during the rotation of the power lever, and means disposed in the path of said member for releasing the same and the cable.

3. A rotary power mechanism, including a support, a rotatable power lever carried thereby, a hoisting cable, a cable terminal engaging and guiding rod connected to both ends of the lever with the body portion thereof in spaced relation thereto, and coöperating means carried by the lever and the support for automatically engaging the cable intermediate its ends during a portion of the rotation of the lever and for automatically releasing the cable to gravity.

4. A rotary power mechanism, including a support, a rotatable power lever carried thereby, a hoisting cable, a cable terminal engaging and guiding rod connected to both ends of the lever and with the body portion thereof in spaced relation thereto, a hinged cable engaging member mounted in one end of the lever, and means carried by the support and in the path to engage said member to automatically release the same once each revolution of the power lever.

5. A rotary power mechanism, including a supporting frame, a circular track carried thereby, a power lever pivoted intermediate of its end to the support with portions overlying the track, a runner carried upon one end of the lever and in engagement with the track, a rod having one terminal connected with the runner and the other terminal connected to the opposite free end of the lever, a cable having one terminal slidably connected to the rod, a pivoted cable engaging member carried by the runner in the end remote from the draft end of the lever, and means disposed in the path thereof and carried by the support for releasing the pivoted member and the cable to gravity.

6. A rotary power mechanism, including a supporting frame, a circular track carried thereby, a power lever pivoted intermediate of its ends to the support with portions overlying the track, a runner carried upon one end of the lever and in engagement with the track, a rod having one terminal connected to the runner and the other terminal connected to the opposite free end of the lever, a cable having one terminal slidably connected to the rod, a pivoted cable engaging member carried by the runner in the end remote from the draft end of the lever, and means disposed in the path thereof and carried by the support for releasing the pivoted member and the cable to gravity, said runner being provided with an upstanding rim for engagement with the cable during the pulling stroke of the power lever and to assist in guiding the cable when automatically released.

In testimony that I claim the foregoing as my own, I have hereto affixed my signature in the presence of two witnesses.

WILLIAM B. CRAIG.

Witnesses:
CHAS. OBERLINK,
T. P. CLEAVER.

---

Copies of this patent may be obtained for five cents each, by addressing the "Commissioner of Patents, Washington, D. C."